United States Patent
Beierschmitt et al.

(10) Patent No.: US 10,084,304 B2
(45) Date of Patent: Sep. 25, 2018

(54) UPSTREAM PARALLEL ARC FAULT OUTLET PROTECTION METHOD

(71) Applicant: SCHNEIDER ELECTRIC USA, INC., Schaumburg, IL (US)

(72) Inventors: Joseph Beierschmitt, Marion, IA (US); Jeremy Schroeder, Urbana, IA (US)

(73) Assignee: Schneider Electric USA, Inc., Andover, MA (US)

( * ) Notice: Subject to any disclaimer, the term of this patent is extended or adjusted under 35 U.S.C. 154(b) by 238 days.

(21) Appl. No.: 14/900,777

(22) PCT Filed: Jul. 1, 2013

(86) PCT No.: PCT/US2013/048932
§ 371 (c)(1),
(2) Date: Dec. 22, 2015

(87) PCT Pub. No.: WO2015/002633
PCT Pub. Date: Jan. 8, 2015

(65) Prior Publication Data
US 2016/0134100 A1    May 12, 2016

(51) Int. Cl.
*H01H 9/30* (2006.01)
*H02H 3/24* (2006.01)
(Continued)

(52) U.S. Cl.
CPC ............ *H02H 3/24* (2013.01); *H02H 1/0015* (2013.01); *H02H 3/023* (2013.01); *H02H 3/10* (2013.01); *H02H 3/207* (2013.01)

(58) Field of Classification Search
CPC ......... H01H 9/30; H02H 1/0015; H02H 9/541
(Continued)

(56) References Cited

U.S. PATENT DOCUMENTS

| | | |
|---|---|---|
| 5,736,861 A | 4/1998 | Keleher et al. |
| 6,414,829 B1 | 7/2002 | Haun et al. |

(Continued)

FOREIGN PATENT DOCUMENTS

| | | |
|---|---|---|
| CN | 103155325 | 6/2013 |
| RU | 2005105855 | 8/2006 |

(Continued)

OTHER PUBLICATIONS

CN103155325B; Method and device for safely switching a photovoltaic system after differentiating the arc type; Specification and Figures.*

(Continued)

*Primary Examiner* — Dharti Patel
(74) *Attorney, Agent, or Firm* — Locke Lord LLP

(57) ABSTRACT

An arc fault circuit interrupter (AFCI) outlet is disclosed which detects and interrupts upstream parallel arc faults. The example AFCI outlet includes a switching element coupled between the line and neutral conductors at the outlet. The outlet also includes a voltage sensor and a current sensor. A parallel upstream arc fault is detected from a sensed voltage drop and no corresponding increase in current. On detecting the arc fault, the switching element is closed and current flows through the relatively lower resistance switching element interrupting power through the arc fault. The closed switching element results in an overcurrent condition causing an upstream conventional thermal-magnetic circuit breaker to trip.

13 Claims, 3 Drawing Sheets

(51) Int. Cl.
*H02H 3/02* (2006.01)
*H02H 3/10* (2006.01)
*H02H 3/20* (2006.01)
*H02H 1/00* (2006.01)

(58) Field of Classification Search
USPC ........................................................ 361/2–6
See application file for complete search history.

(56) References Cited

U.S. PATENT DOCUMENTS

| | | |
|---|---|---|
| 6,504,692 B1 | 1/2003 | Macbeth et al. |
| 6,621,669 B1 | 9/2003 | Haun et al. |
| 6,987,389 B1 | 1/2006 | Macbeth et al. |
| 2001/0036047 A1 | 11/2001 | Macbeth et al. |
| 2013/0128396 A1* | 5/2013 | Danesh .................. G01R 19/00 361/45 |

FOREIGN PATENT DOCUMENTS

| | | |
|---|---|---|
| RU | 117686 U1 | 6/2012 |
| WO | WO2006086310 | 8/2006 |
| WO | WO2009131817 | 11/2009 |

OTHER PUBLICATIONS

English Language Machine Translation of Abstract and Claims for Russian Patent Application Publication No. RU117686(U1), published Jun. 27, 2012, 2 pages.

English Language Machine Translation of Russian Patent Application Publication No. RU2311699(C2), published Nov. 27, 2007, 11 pages.

Search Report of Russian Patent Application No. 2015153060, dated Jul. 4, 2017, 2 pages.

International Search Report and Written Opinion for PCT/US13/48932 dated Dec. 9, 2013, 16pp.

Extended European Search Report for European Patent Application No. 13888720.3, Dated Feb. 3, 2017, 8 pages.

English Language Machine Translation of Chinese Patent Application Publication No. CN103155325, published on Jun. 12, 2013, 16 pages.

Examination Report No. 2 dated May 31, 2018 for Australian Patent Application No. 2013393336, 3 pages.

\* cited by examiner

UPSTREAM PARALLEL ARC FAULT OUTLET PROTECTION METHOD

TECHNICAL FIELD

The present disclosure relates generally to fault detection in an electrical system and more specifically to upstream arc fault protection through a switching element at an outlet.

BACKGROUND

Traditional circuit breakers detect overcurrent conditions from electrical outlets downstream from the circuit breaker. Such breakers trip on detection of an overcurrent situation occurring from loads plugged into one of the downstream outlets. There are additional hazards including ground faults from a line conductor or a neutral conductor. Ground faults require ground fault circuit interrupter devices to detect and interrupt power to outlets. Another form of fault is an arc fault that may occur on the neutral and/or conductor lines between the outlets and the circuit breaker. Protection against arc faults is increasingly required in residential settings in the form of arc fault circuit interrupter (AFCI) devices. Such devices detect arcs in neutral and/or line conductors and remove power before such arcs can cause an electrical fire. AFCI protection may be located in outlets. Such outlets monitor and protect against faults with a set of contacts downstream of a detection module such as at the outlet itself. Faults are typically detected by the detection sensor in the outlet or outlets downstream of a conventional thermal-magnetic circuit breaker which breaks a contact in the AFCI outlet and thereby prevents current flow through the outlet and outlets downstream from the AFCI protected outlet.

With present devices for fault detection, the interruption by the AFCI outlet may only be triggered as a result of parallel arc faults detected downstream from the outlet or series arc faults. Thus, the outlet and corresponding detector cannot interrupt an upstream parallel arc fault (occurring between the outlet and the circuit breaker) because the contact interruption device at a known AFCI outlet cannot detect such faults and even if the contact interruption mechanism is triggered, the current would continue to flow through the fault. In a conventional electrical system, conventional circuit breakers cannot react quickly enough to such arc faults between the circuit breaker and an outlet. This poses a potential danger since the arc fault may be allowed to continue for some time before the circuit breaker interrupts power to the outlet.

Thus, a need exists for an arc fault detection and interruption system that detects parallel arc faults at points upstream from an outlet. There is a further need for an interruption system that interrupts power by tripping a circuit breaker mechanism upstream of the outlet. There is a further need for an arc fault detection system that uses existing components in an AFCI outlet for detection of arc faults upstream of an outlet.

SUMMARY

One disclosed example is an arc fault circuit interrupter (AFCI) outlet which detects and interrupts upstream parallel arc faults in conjunction with a conventional thermal-magnetic circuit breaker. The example AFCI outlet includes a switching element coupled between the line and neutral conductors, a voltage sensor coupled between the neutral and line conductors and a current sensor on the line conductor. When a parallel upstream arc fault is detected by sensing a large voltage drop but no current, the switching element is closed and current flows through the relatively lower resistance switching element interrupting power through the arc fault. The closed switching element results in an overcurrent condition causing the upstream conventional thermal-magnetic circuit breaker to trip.

Thus, the provided AFCI outlet allows detection of parallel arc faults upstream which currently cannot be protected by known AFCI outlets. The example outlet does not require additional sensor components from known AFCI outlets but provides an interruption at the proximate location of the detected parallel arc fault. Interruption of the upstream parallel fault occurs at the branch circuit breaker. The example AFCI outlet speeds up the branch circuit breaker response time by increasing the current level into the over current protection level of the branch circuit breaker. The example outlet causes hazardous arcing current to transition to strictly over current fault current, thus reducing the risk of fire. The arrangement also allows reset capability for unwanted tripping due to series arc fault detection to be placed in position closer to the user (i.e., in the AFCI outlet) and without the need for a trip signal communication to an electronic upstream circuit breaker. Further, the switching element system, upon detection of a parallel arc fault upstream of the AFCI outlet, produces a short which ensures that the resultant current always exceeds the over current trip level of the branch circuit breaker and thus removes the practical limitation on the length of the wire connecting the AFCI outlet to the circuit breaker (the "home run") for effective parallel fault interruption.

Additional aspects will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

Figure 1:
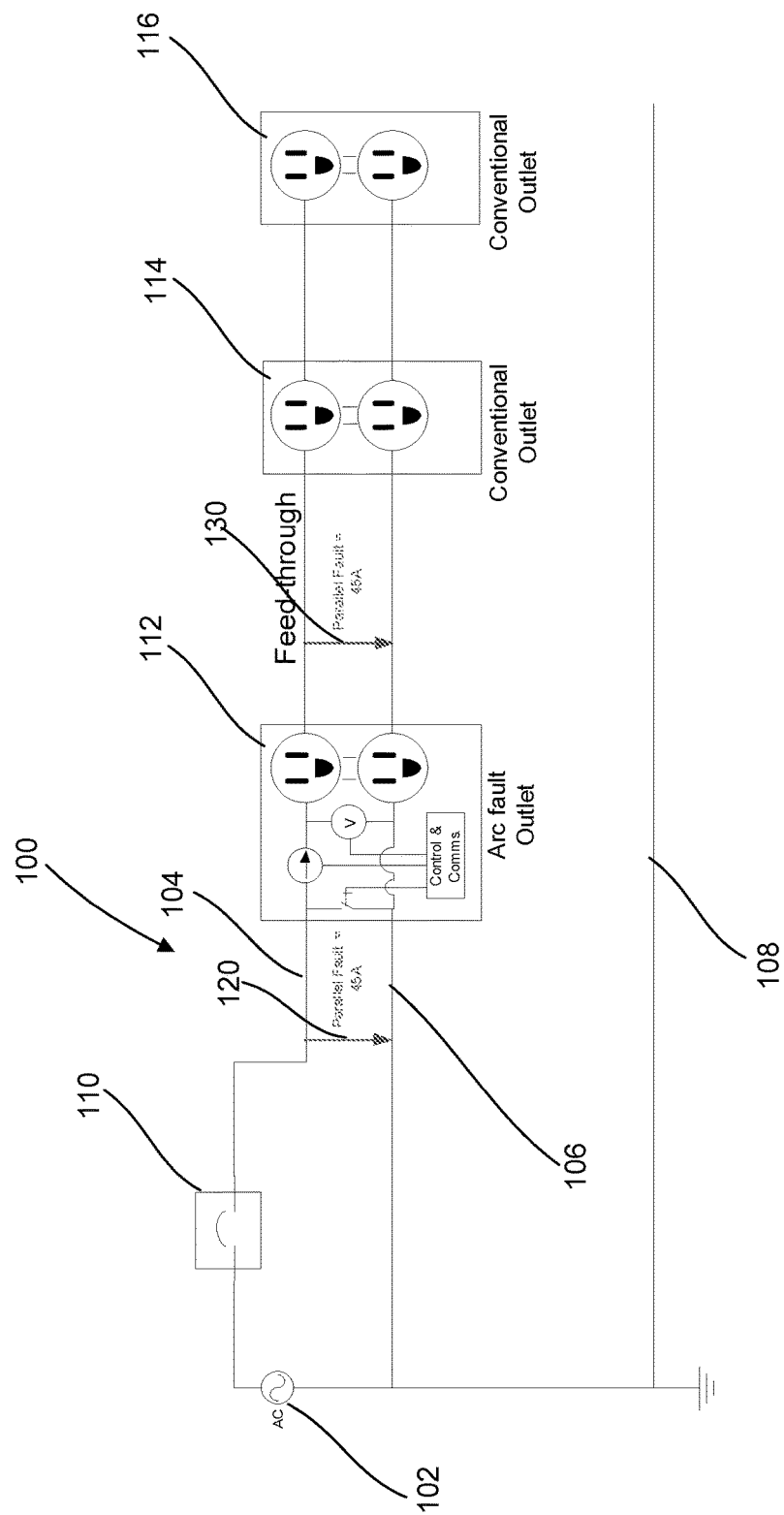
FIG. 1 is a circuit diagram of a system of outlets with an AFCI outlet for upstream arc fault detection and protection with a conventional circuit breaker.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

One disclosed example is an outlet to perform arc fault protection and detection. The outlet is located downstream from a circuit breaker. The outlet includes a switching element coupled between the line conductor and the neutral conductor having an open position and a closed position coupling the line conductor to the neutral conductor. The outlet includes a voltage sensor coupled between the line conductor and the neutral conductor and a current sensor coupled on the line conductor. A controller is coupled to the switching element, the current sensor and the voltage sensor. The controller detects a large voltage drop on the line conductor and no corresponding substantial increase in current on the line conductor indicative of a parallel arc fault between the outlet and the circuit breaker. The controller closes the switching element in response to the detecting.

Another example is a method of determining an arc fault upstream of an outlet coupled to a circuit breaker via a line conductor and a neutral conductor. A high voltage drop is detected between the line conductor and neutral conductor via a voltage sensor coupled between the line conductor and neutral conductor in the outlet. No substantial corresponding increase in current via a current detector on the line conductor at the outlet is detected when the high voltage is detected. A switching element coupled between the line conductor and the neutral conductor is closed to create a low resistance current path between the line conductor and neutral conductor when the high voltage and no substantial increase in current is detected.

Another example is a system to interrupt power when a parallel arc fault is detected. The system includes a line conductor and a neutral conductor. A circuit breaker is coupled to the line conductor and the neutral conductor. The circuit breaker interrupts the flow of power when an overcurrent condition is detected. An arc fault protection outlet is coupled to the circuit breaker via the neutral and line conductors. The outlet includes a switching element coupled between the neutral and line conductors, an outlet connector for connection to a load. The outlet includes a controller coupled to the switching element to control the switching element. A voltage sensor is coupled between the neutral and line conductors and a current sensor is coupled to the line conductor. The controller closes the switching element to electrically couple the neutral and line conductors when a high voltage drop is detected without an corresponding substantial increase in current thereby indicating the occurrence of an arc fault between the outlet and the circuit breaker.

FIG. 1 shows an electrical supply system 100 which may be used in a residential dwelling or other building. The system 100 includes an alternating current source 102 which is coupled to a line conductor 104, a neutral conductor 106 and a ground conductor 108. The alternating current source 102 is coupled to a circuit breaker 110 via the line conductor 104 and the neutral conductor 106. The circuit breaker 110 is coupled in series to an arc fault protection outlet 112 downstream from the circuit breaker 110 and upstream from conventional outlets 114 and 116. The outlets 112, 114 and 116 provide electrical connection to the line conductor 104, neutral conductor 106 and ground conductor 108 for loads plugged into the outlets 112, 114 and 116 via conventional three pronged male connectors.

As will be explained below, the arc fault protection outlet 112 provides arc fault detection and protection for the outlets 114 and 116 which are located downstream from the outlet 112. A parallel arc fault 120 may occur upstream of the arc fault protection outlet 112 between the line conductor 104 and the neutral conductor 106. Other parallel arc faults such as an arc fault 130 may occur downstream of the protection outlet 112. Conventional arc fault detection systems in the arc fault protection outlet 112 detect and protect against parallel arc faults downstream such as the arc fault 130 but cannot protect against arc faults upstream from the arc fault protection outlet 112 such as the parallel arc fault 120 despite the fact that the arc fault 120 may occur in proximity to the arc fault protection outlet 112.

Figure 2:
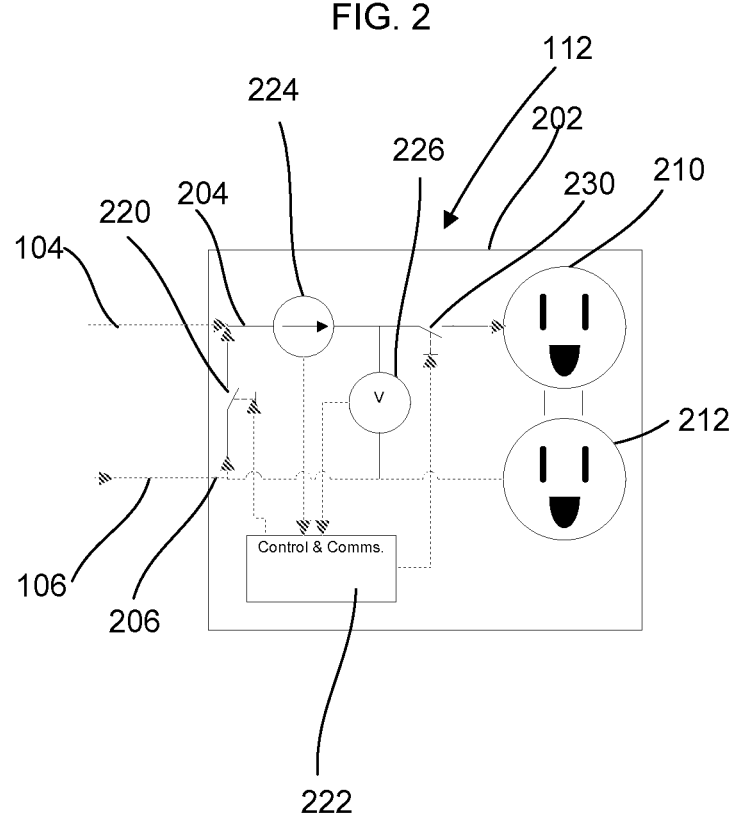
FIG. 2 is a detailed circuit diagram of the detection elements and switching elements in the AFCI outlet in FIG. 1 that detect and interrupts upstream arc faults.

FIG. 2 shows a detailed electrical diagram of the components of the arc fault protection outlet 112 in FIG. 1. The arc fault protection outlet 112 in this example is capable of detecting parallel arc faults on a branch upstream of the outlet 112 and causing an interruption of power to prevent fire risk from the arc fault. A faceplate 202 provides conventional three prong female connectors to load devices that may be provided power from the arc fault protection outlet 112. The arc fault protection outlet 112 includes a line conductor 204 coupled to the line conductor 104 in FIG. 1 and a neutral conductor 206 coupled to the neutral conductor 106 in FIG. 1. The line conductor 204 and the neutral conductor 206 supply power to the faceplate 202. In this example, the faceplate 202 includes two conventional three prong connectors 210 and 212. A load with a conventional three prong plug may be plugged into the three prong connector 210 or 212. When a load is plugged in, power is supplied through the line conductor 204 and the neutral conductor 206 to create a closed circuit.

The outlet 212 includes a switching element 220 which is coupled between the line conductor 204 and the neutral conductor 206. In this example, the switching element 220 is a solid state transistor but other types of switching devices such as relays, IGBTs, MOSFETS, etc. may be used. The switching element 220 has a closed position allowing electrical connection between the line conductor 204 and the neutral conductor 206. The switching element 220 also has an open position which creates an open circuit between the line conductor 204 and the neutral conductor 206. In normal operation, the switching element 220 is in an open position, allowing power to flow through line conductor 204 to the connectors 210 and 212.

The arc fault protection outlet 112 also includes a controller 222, a current sensor 224, a voltage sensor 226 and a contact relay 230. As is understood, the controller 222 in conjunction with the current sensor 224 and the voltage sensor 226 provide downstream arc fault detection and current interruption for the arc fault protection outlet 212. In the case of a parallel arc fault occurring downstream from the arc fault protection outlet 112, a voltage is detected on the voltage sensor 226 and a change in current is detected on the current sensor 224. In the case of a series arc fault, a change in current is detected by the controller 222. In either case, the controller 222 activates the contact relay 230 and therefore interrupts the connection on the line conductor 204 thereby preventing current from flowing to the three prong connectors 210 and 212 as well as the three prong connectors on the outlets 114 and 116 downstream from the arc fault protection outlet 112. The contact relay 230 may typically be reset by pressing a button (not shown) on the faceplate 202. Such a conventional arc fault detection system cannot prevent an upstream parallel arc fault such as the arc fault 120 in FIG. 1 since activating the contact relay 230 will not prevent current from flowing to the arc fault 120 upstream from the arc fault protection outlet 112.

For upstream parallel arc fault protection, the controller 222 is coupled to the switching element 220 and outputs signals to open or close the switching element 220. The current sensor 224 is coupled on the line conductor 204 to sense current flowing on the line conductor 204 and provides an output signal representative of the detected current to the controller 222. The voltage sensor 226 is coupled between the line conductor 204 and the neutral conductor 206 to provide a signal representing the voltage between the line conductor 204 and the neutral conductor 206. The voltage sensor 226 provides an output signal representative of the detected voltage to the controller 222. The controller 222 uses the detected current and voltage from the current and voltage sensors 224 and 226 respectively to determine whether an arc fault condition exists upstream of the arc fault protection outlet 112. Such a parallel arc fault such as the arc fault 120 in FIG. 1 may occur on the branch wiring between the circuit breaker 110 and the arc fault protection outlet 112. If such an upstream parallel arc fault is detected, the controller 222 closes the switching element 220.

Under normal operations with a load plugged into one of the connectors 210 or 212, the switching element 220 is in an open position and no current will flow between the line conductor 204 and the neutral conductor 206. Thus, in normal operation, current flows to the connected load through the line conductor 204 and the neutral conductor 206 through the connectors 210 and 212. The arc fault protection outlet 112 may detect a parallel arc fault by detecting a large voltage drop between the line conductor 204 and the neutral conductor 206 via the voltage sensor 226 with no substantial increase in the current on the downstream branch represented by the line conductor 204 from the current sensor 224. The controller 222 will close the switching element 220 when such an upstream parallel arc fault is detected.

When the switching element 220 is closed, current flows from the line conductor 204 through the switching element 220 to the neutral conductor 206 rather than through the parallel arc fault 120 in FIG. 1 due to the relatively lower resistance of the closed switching element 220. Once the switching element 220 is closed, the upstream circuit breaker 110 will trip and interrupt power to the arc fault protection outlet 112 based on the short circuited current on the line conductor 104 exceeding the thermal-magnetic trip curve of the circuit breaker 110 and thereby interrupting power to the parallel arc fault 120.

In this example, the controller 222 may be a microcontroller, microprocessor, a processor, an application specific integrated circuit (ASIC), a programmable logic controller (PLC), a programmable logic device (PLD), a field programmable logic device (FPLD), a field programmable gate array (FPGA), discrete logic, etc. or any other similar device. The controller 222 may include a memory (not shown), which may include hardware, firmware, or tangible machine-readable storage media that store instructions and data for performing the operations described herein. Machine-readable storage media includes any mechanism that stores information and provides the information in a form readable by a machine. For example, machine-readable storage media includes read only memory (ROM), random access memory (RAM), magnetic disk storage media, optical storage media, flash memory, etc.

Figure 3:
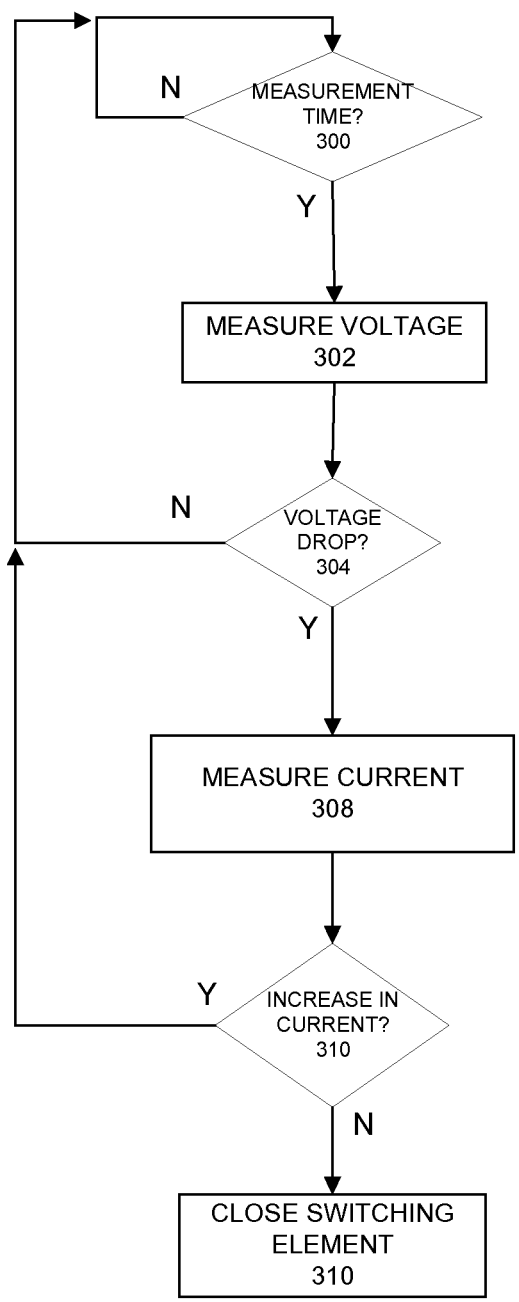
FIG. 3 is a flow diagram of the control algorithm executed by the controller at the outlet in FIG. 2 to detect and protect against arc faults.

The operation of the example decision algorithm to detect an arc fault upstream from an outlet such as the outlet 112 will now be described with reference to FIGS. 1 and 2 in conjunction with the flow diagram shown in FIG. 3. The flow diagram in FIG. 3 is representative of example machine-readable instructions for implementing the processes described above to detect an arc fault upstream from an outlet such as the arc fault protection outlet 112 in FIG. 1. In this example, the machine readable instructions comprise an algorithm for execution by: (a) a processor, (b) a controller, or (c) one or more other suitable processing device(s). The algorithm can be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the controller 222 in FIG. 2 could be implemented by software, hardware, and/or firmware. Further, although the example algorithm is described with reference to the flowchart illustrated in FIG. 3, persons of ordinary skill in the art will readily appreciate that other methods of implementing the example machine readable instructions might alternatively be used. For example, the order of execution of the blocks can be changed, and/or some of the blocks described can be changed, eliminated, or combined.

The decision algorithm in FIG. 3 maintains a ready state. The algorithm checks whether measurements should be taken (300). If the measurements are not taken, the algorithm cycles back to the ready state (300). The algorithm in this example checks for arc faults on a periodic basis determined by the controller 222, e.g. every millisecond. If a measurement should be taken, the algorithm measures the voltage between the line conductor 204 and the neutral conductor 206 via the voltage sensor 226 (302). The algorithm then determines whether a voltage drop occurs based on the measured voltage (306). If no voltage drop is sensed, the algorithm returns to the ready state (300). If a voltage drop is determined (306), the algorithm measures the current on the line conductor 204 from the current sensor 224 (308). The algorithm determines whether there is an increase in current flow based on the measured current (310). If there is an increase in current flowing on the line conductor 204 based on the measured current, the algorithm returns to the ready state (300). If there is no increase in current flowing through the line conductor, the algorithm sends a control signal to close the switching element 220 (310). As explained above, the switching element 220 will divert current from the parallel arc fault upstream through the switching element 220. The diverted current will cause the upstream circuit breaker 110 to trip when the short is detected from current flowing through the closed switching element 220, thus removing all downstream current.

While the present invention has been described with reference to one or more particular embodiments, those skilled in the art will recognize that many changes can be made thereto without departing from the spirit and scope of the present invention. Each of these embodiments and obvious variations thereof is contemplated as falling within the scope of the claimed invention, which is set forth in the following claims.

What is claimed is:

1. An outlet to perform arc fault protection and detection, the outlet located downstream from a circuit breaker, the outlet comprising:
   a switching element coupled between a line conductor and
      a neutral conductor having an open position and a closed position coupling the line conductor to the neutral conductor;
   a voltage sensor coupled between the line conductor and the neutral conductor;
   a current sensor coupled on the line conductor; and
   a controller coupled to the switching element, the current sensor and the voltage sensor, the controller detecting a large voltage drop on the line conductor and no corresponding substantial increase in current on the line conductor indicative of a parallel arc fault between the outlet and the circuit breaker, and the controller closing the switching element in response to the detecting, wherein the closed position of the switching element creates a low resistance path for current flow sufficient to cause the circuit breaker to trip.

2. The outlet of claim 1, where the switching element is a solid state transistor.

3. The outlet of claim 1, wherein the controller is a microcontroller.

4. The outlet of claim 1, wherein the controller detects a change in current on the line conductor to detect an arc fault on a second outlet coupled in series to the line conductor downstream of the outlet.

5. The outlet of claim 4, further comprising a contact relay on the line conductor, the controller activating the contact relay to interrupt the line conductor when an arc fault is detected on the second outlet downstream of the outlet.

6. A method of determining parallel arc fault upstream of an outlet coupled to a circuit breaker via a line conductor and a neutral conductor, comprising:
  detecting a high voltage drop between the line conductor and neutral conductor via a voltage sensor coupled between the line conductor and neutral conductor in the outlet;
  detecting no substantial corresponding increase in current via a current detector on the line conductor at the outlet; and
  closing a switching element coupled between the line conductor and the neutral conductor to create a low resistance current path between the line conductor and neutral conductor when the high voltage drop and no substantial increase in current is detected, wherein the closed position of the switching element creates a low resistance path for current flow sufficient to cause the circuit breaker to trip.

7. The method of claim 6, where the switching element is a solid state transistor.

8. The method of claim 6, wherein the switching element is closed via a controller.

9. The method of claim 6, further comprising detecting a change in current on the line conductor to detect an arc fault on a second outlet coupled in series to the line conductor downstream of the outlet.

10. The method of claim 9, further comprising activating a contact relay to interrupt the line conductor when an arc fault is detected on the second outlet downstream of the outlet.

11. A system to interrupt power when an upstream parallel arc fault is detected, the system comprising:
  a line conductor;
  a neutral conductor;
  a circuit breaker coupled to the line conductor and the neutral conductor, the circuit breaker interrupting the flow of power when an overcurrent condition is detected;
  an arc fault protection outlet coupled to the circuit breaker via the neutral and line conductors, the outlet including a switching element coupled between the neutral and line conductors, an outlet connector for connection to a load, a controller coupled to the switching element to control the switching element, a voltage sensor coupled between the neutral and line conductors and a current sensor coupled to the line conductor, the controller closing the switching element to electrically couple the neutral and line conductors when a high voltage drop is detected without an corresponding substantial increase in current thereby indicating the occurrence of an arc fault between the outlet and the circuit breaker, wherein closing the switching element creates a low resistance path for current flow sufficient to cause the circuit breaker to trip.

12. The system of claim 11, where the switching element is a solid state transistor.

13. The system of claim 11, wherein the controller is a microcontroller.

* * * * *